United States Patent
Murdoch

(10) Patent No.: US 10,106,975 B2
(45) Date of Patent: Oct. 23, 2018

(54) MASONRY ANCHOR OF THE EXPANSION TYPE

(71) Applicant: Illinois Tool Works Inc., Glenview, IL (US)

(72) Inventor: Thomas Murdoch, Warooka (AU)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/434,668

(22) Filed: Feb. 16, 2017

(65) Prior Publication Data

US 2017/0241128 A1 Aug. 24, 2017

(30) Foreign Application Priority Data

Feb. 20, 2016 (AU) .................................. 2016900576
Feb. 15, 2017 (AU) .................................. 2017201016

(51) Int. Cl.
*E04B 1/41* (2006.01)
*B66C 1/66* (2006.01)
*E04G 21/14* (2006.01)

(52) U.S. Cl.
CPC ............ *E04B 1/4121* (2013.01); *B66C 1/666* (2013.01); *E04B 1/415* (2013.01); *E04B 1/4157* (2013.01); *E04G 21/142* (2013.01)

(58) Field of Classification Search
CPC ...... E04G 21/142; B66C 1/666; E04B 1/4114; E04B 1/4121; E04B 1/415; E04B 1/4157; E04B 1/41
See application file for complete search history.

(56) References Cited

U.S. PATENT DOCUMENTS

| | | | | |
|---|---|---|---|---|
| 2,950,576 A | * | 8/1960 | Rubenstein | E04B 1/383 264/228 |
| 3,404,503 A | * | 10/1968 | Courtois | B28B 23/005 116/DIG. 14 |
| 4,290,638 A | * | 9/1981 | Manning | B66C 1/666 294/89 |
| 4,483,121 A | * | 11/1984 | Froening | E04B 1/4128 52/125.5 |
| 4,652,193 A | * | 3/1987 | Hibbs | E04B 1/41 411/82.3 |
| 5,116,176 A | * | 5/1992 | Yousuke | F16B 13/08 411/33 |

(Continued)

FOREIGN PATENT DOCUMENTS

AU 2004203247 A1 2/2005
DE 1291300 B 3/1969

(Continued)

OTHER PUBLICATIONS

European Patent Office, Extended European Search Report dated Jun. 9, 2017 in corresponding European Patent Application No. 17156533.6 (5 pages).

(Continued)

*Primary Examiner* — Adriana Figueroa
*Assistant Examiner* — Jessie T Fonseca
(74) *Attorney, Agent, or Firm* — Neal, Gerber & Eisenberg LLP

(57) ABSTRACT

A masonry anchor comprising an anchor member having a socket formed in one end, the socket being configured to receive and secure a mounting portion of a mounting fastener.

17 Claims, 5 Drawing Sheets

(56) References Cited

U.S. PATENT DOCUMENTS

| | | | |
|---|---|---|---|
| 5,816,759 A | 10/1998 | Ernst et al. | |
| 6,457,895 B1 * | 10/2002 | Salman | E01F 9/635 256/1 |
| 7,445,251 B2 | 11/2008 | Nilsen et al. | |
| 8,505,856 B2 | 8/2013 | Panasik et al. | |
| 2002/0070322 A1 * | 6/2002 | Zambelli | E04G 21/142 248/200 |
| 2003/0208969 A1 * | 11/2003 | Lancelot, III | E04G 21/142 52/125.4 |
| 2014/0260067 A1 * | 9/2014 | Pryor | F16B 37/0857 52/704 |

FOREIGN PATENT DOCUMENTS

| | | | | |
|---|---|---|---|---|
| DE | 19653985 A1 * | 6/1998 | | E01D 19/103 |
| JP | 5559926 B1 * | 7/2014 | | F16B 35/04 |

OTHER PUBLICATIONS

Canadian Office Action for Canadian Application No. 2,958,395, dated Feb. 20, 2018 (4 pages).

\* cited by examiner

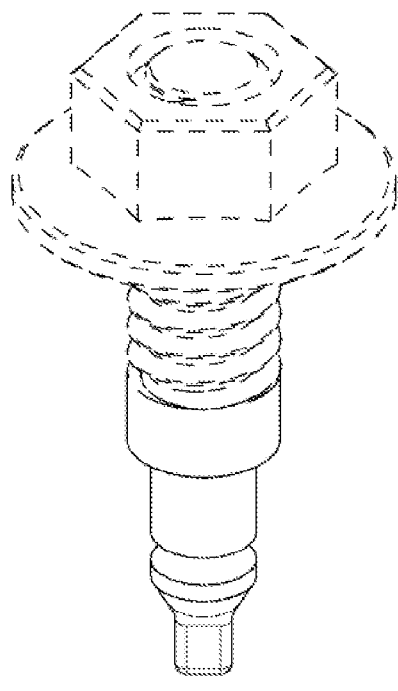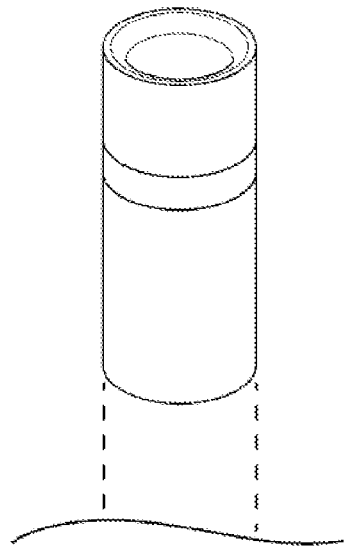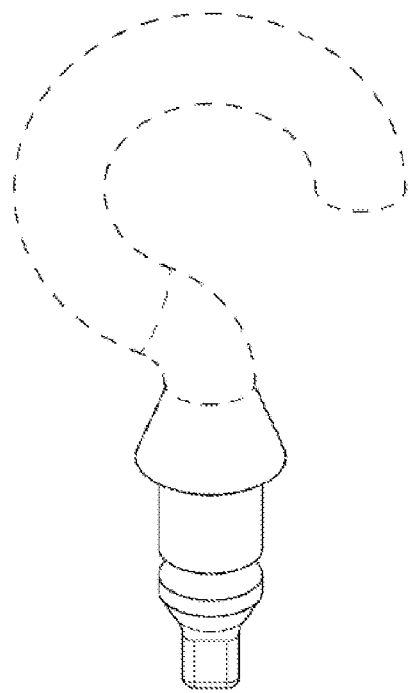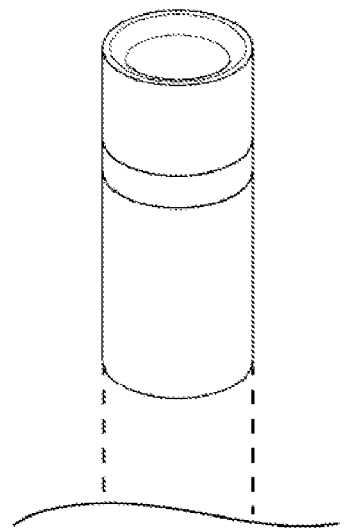
FIGURE 5　　　　　　　　　　　FIGURE 6

MASONRY ANCHOR OF THE EXPANSION TYPE

PRIORITY CLAIM

This patent application claims priority to and the benefit of Australian Patent Application No. 2017201016, which was filed on Feb. 15, 2017, which claims priority to and the benefit of Australian Patent Application No. 2016900576, which was filed on Feb. 18, 2016, the entire contents of each of which are incorporated herein by reference.

FIELD

The present disclosure relates to a masonry anchor of the expansion type.

BACKGROUND

It is desirable when prefabricating building sections, such as prefabricated wall and/or floor panels, to provide provision for easily mounting fasteners to the panel. This would allow for custom fit-outs to be completed easily and cost effectively.

It is also desirable to reduce product proliferation amongst construction fasteners by making mounting fasteners interchangeable with different types of anchors.

Examples of the present disclosure seek to solve, or at least ameliorate, one or more disadvantages of previous masonry anchors, or to at least provide a useful alternative.

SUMMARY

According to the present disclosure, there is provided a masonry anchor of the expansion type, comprising an anchor member having a socket formed in an end which is accessible after installation, the socket being configured to releasably receive a mounting portion of a correspondingly shaped mounting fastener.

According to one embodiment of the present disclosure, the socket includes resiliently displaceable locking formations configured to be received against the mounting portion.

In various embodiments, the locking formations are generally semi-spherical and extend partially into a void of the socket and are configured to be received in a groove formed in the mounting portion, the locking formations being urged radially inwardly for securing the anchor member and the mounting fastener together. The locking formations can be integrally formed with a resilient band extending around the anchor member.

In some embodiments, the locking formations can be urged radially outwardly to release the mounting fastener.

The mounting portion may be formed with a noncircular profile that is configured to be received by a correspondingly shaped portion of the socket to transmit torque from the mounting fastener to the anchor. In certain embodiments, the noncircular profile is rectangular.

According to the present disclosure, there is also provided a system for installing a mounting fastener in a masonry panel, comprising a socket to be embedded in the panel which is accessible after installation, the socket being configured to releasably receive a mounting portion of a correspondingly shaped mounting fastener, wherein the socket includes resiliently displaceable locking formations configured to be received against the mounting portion to secure the mounting fastener to the panel.

According to the present disclosure, there is also provided a masonry anchor of the expansion type, comprising an anchor member having a socket formed in an end which is accessible after installation, the socket being configured to releasably receive a mounting portion of a correspondingly shaped mounting fastener for securing the fastener to the anchor, wherein anchor is configured to secure the mounting fastener with a push and twist action.

According to the present disclosure, there is also provided a masonry anchor of the expansion type, comprising an anchor member having an end which is accessible after installation, the end being configured to receive a correspondingly shaped socket to releasably affix a mounting portion of a mounting fastener to the masonry anchor.

According to the present disclosure, there is also provided a kit comprising at least one masonry anchor of the above described type and a plurality of mounting fasteners. In various embodiments, the mounting fasteners are selected from the group comprising a screw thread, a hook, and a bar.

BRIEF DESCRIPTION OF THE DRAWINGS

Certain embodiments of the present disclosure will be further described, by way of non-limiting example only, with reference to the accompanying drawings.

FIGS. 5 and 6 are perspective end views of the masonry anchor of FIG. 1 with different mounting fasteners.

DETAILED DESCRIPTION

Figure 1:
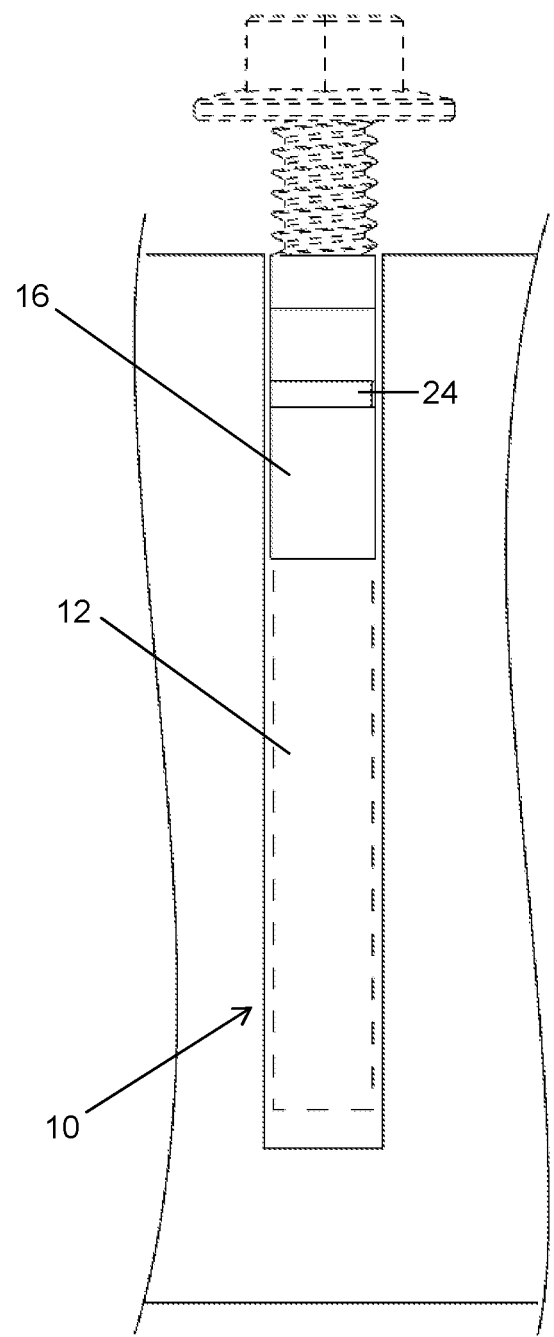
FIG. 1 is a side partial sectional view of a masonry anchor of one embodiment of the present disclosure.

With reference to FIG. 1, there is shown a masonry anchor 10 according to one embodiment of the present disclosure. The masonry anchor 10 is of the expansion type and configured to secure the anchor within a hole.

In one form (not illustrated), the masonry anchor has an anchor member and a sleeve. The anchor member includes an elongate shank with at least one ridge formed thereon, the ridge extending radially outwardly from and along a surface of the shank generally from an end of the anchor member toward a head of the anchor member. The sleeve is coaxial with and at least partially surrounding the anchor member. At least a portion of the sleeve is configured to expand radially outwardly for engagement with an internal surface of a hole. The sleeve has at least one groove formed therein and the or each groove is configured to receive a corresponding ridge of the anchor member. A cross-sectional width of the ridge and/or a cross-sectional width of the groove reduces as the ridge/groove extends toward the head so that as the shank is withdrawn through the sleeve, the ridge urges the groove radially outwardly to bring the sleeve into contact with the hole secure the anchor within the hole.

Such an anchor is described in U.S. patent application Ser. No. 15/434,351, the entire contents of which are incorporated herein by reference. It will be appreciated that the anchor may also take other forms.

Figure 2:
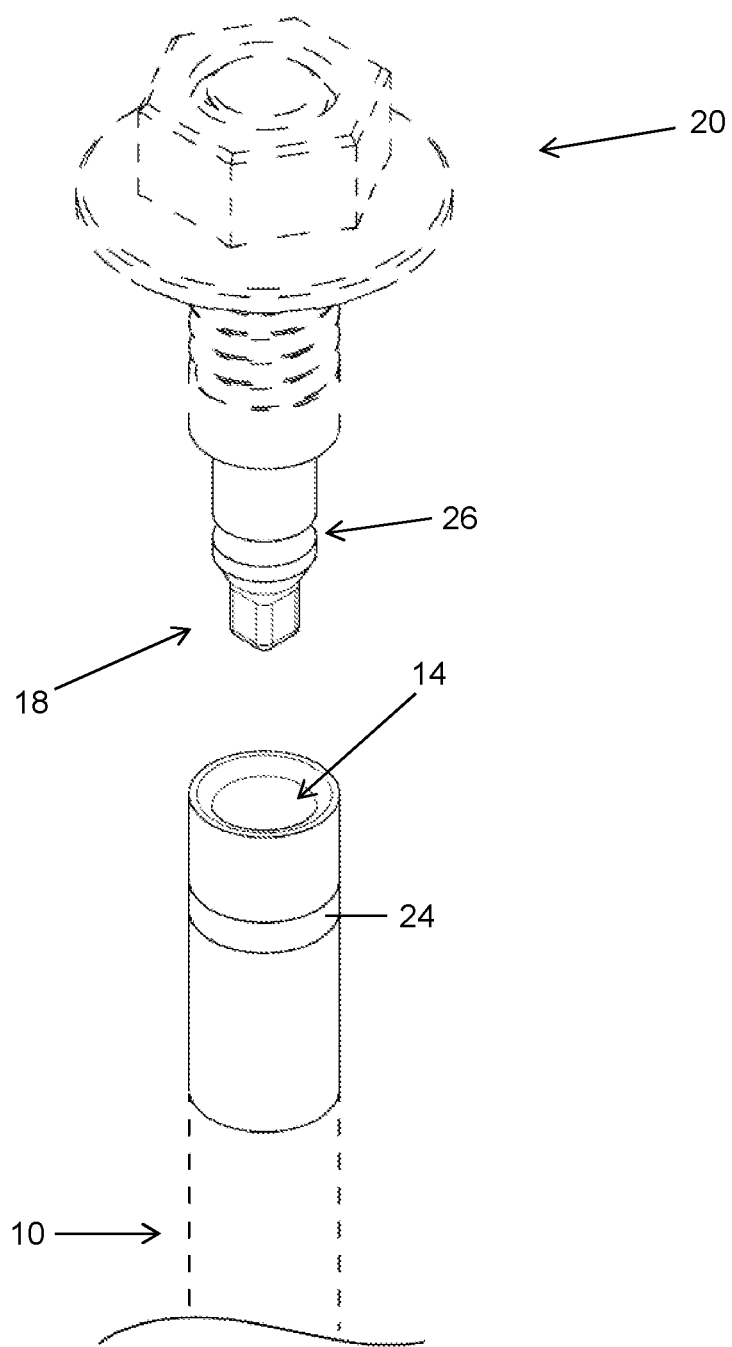
FIG. 2 is a perspective end view of the masonry anchor of FIG. 1.

The masonry anchor 10 comprises an anchor member 12 having a socket 14 formed in an end 16 which is accessible after installation. As can be seen in FIG. 2, the socket 14 is configured to releasably receive a mounting portion 18 of a correspondingly shaped mounting fastener 20.

Figure 3:
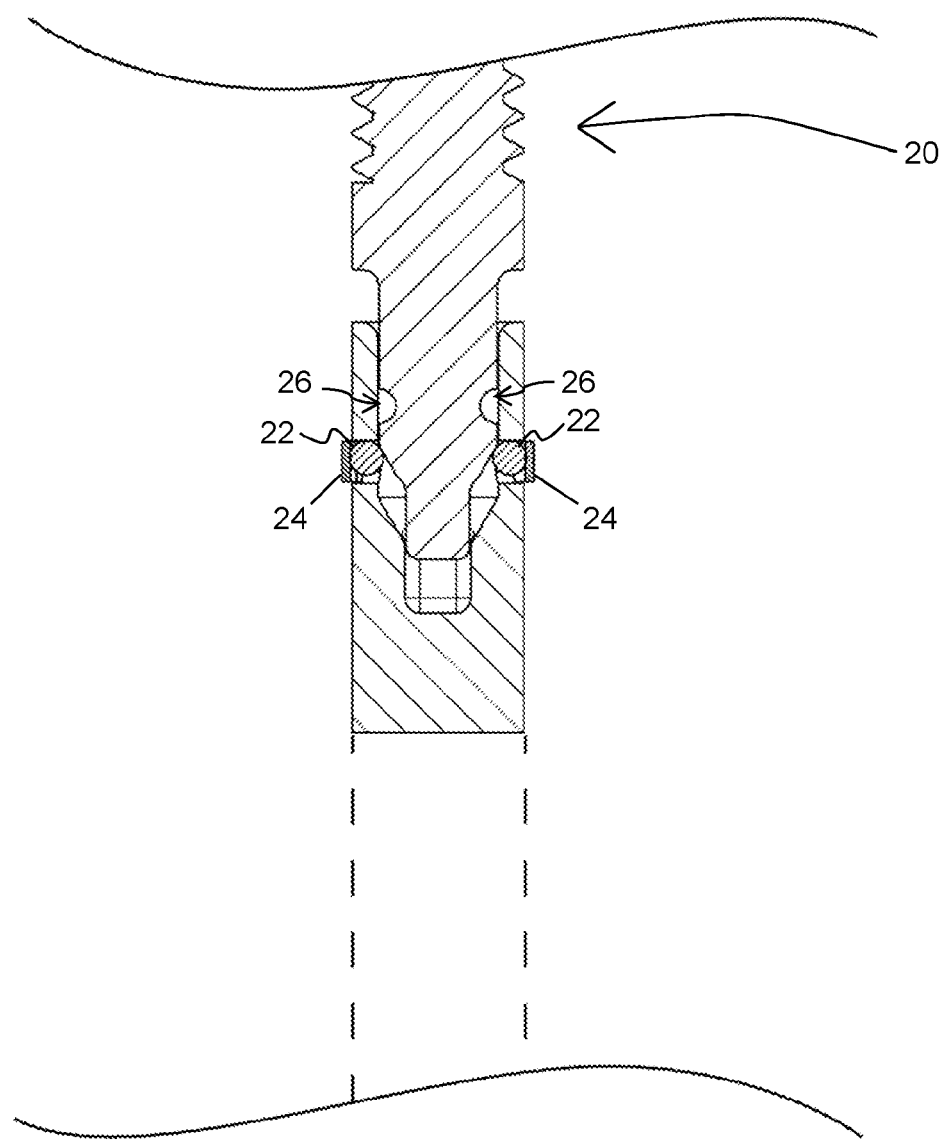
FIG. 3 is a sectional side view of the masonry anchor of FIG. 1 with a mounting fastener partially received therein.
Figure 4:
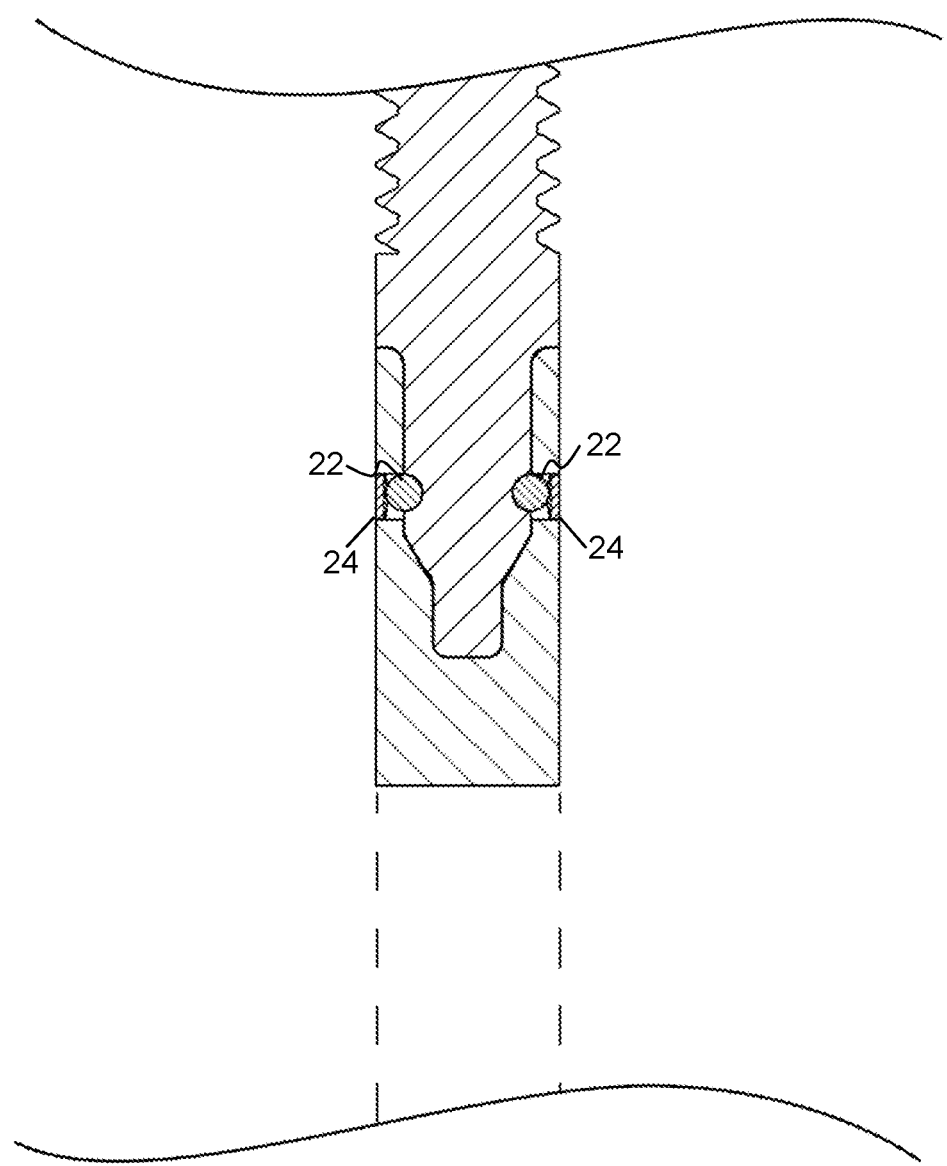
FIG. 4 is a sectional side view of the masonry anchor of FIG. 1 with a mounting fastener fully received therein.

The socket 14 includes resiliently displaceable locking formations 22 configured to be received against the mounting portion 18, as can be seen in FIGS. 3 and 4. In the illustrated embodiment, the locking formations 22 are generally semi-spherical and extend partially into a void of the socket 14 to be received in a recess 26 formed in the mounting portion 18. Although illustrated as being semi-spherical, it will be appreciated that the locking formations 22 may take other forms, such as rectangular for example. It will also be appreciated that recess 26 may also take other forms, such as a continuous groove for example.

The locking formations 22 are urged radially inwardly for securing the anchor member 12 and the mounting fastener 20 together. In the illustrated embodiment, the locking formations 22 are integrally formed with a resilient band 24 extending around the anchor member 12. The resilient band 24 may be a continuous band or may be formed with a longitudinal split to facilitate assembly.

In another form, an axially movable locking collar may be provided, whereby advancing or retracting the collar allows the locking formations to disengage, which in one form is by moving radially outwardly, so that the anchor 10 and the fastener 20 can be disengaged. In another form, the locking formations are held in a disengaged condition until insertion of the fastener 20, upon which the locking formations are moved to a locking condition to prevent the fastener 20 from being removed. In such a form, the locking formations may, for example, be moved under an edge on insertion of the fastener 20 to move them into a locking condition.

FIG. 3 illustrates the masonry anchor 10 with a mounting fastener 20 partially installed. It can be seen that the locking formations 22 are urged outwardly due to a tapered leading edge of the mounting fastener 20. As the mounting fastener 20 is advanced further into the socket 14, as illustrated in FIG. 4, the locking formations 22 are released and move radially inwardly so as to be received in recess 26, thereby locking the mounting fastener 20 to the anchor 10.

The masonry anchor 10 provides a snap lock fitting for a mounting fastener 20 so that a mounting fastener 20 may be quickly and easily installed. In various embodiments, the mounting fastener is locked in place once installed and cannot be removed though, in other embodiments, a release mechanism may be provided, though it will be appreciated that the release mechanism may only be operable under considerable force, which may be destructive of a portion of the mounting fastener 20. In one example, the locking formations 22 can be urged radially outwardly to release the mounting fastener 20. In such embodiments, provision may be made for a screwdriver to be inserted into the socket 14 or the mounting fastener 20 to release the band 24. In other example, the locking formations 22 or the band 24 may be deformable.

As illustrated in FIG. 2, the mounting portion 18 is formed with a noncircular profile, which is configured to be received by a correspondingly shaped portion of the socket 14 to transmit torque from the mounting fastener 20 to the anchor 10. In various embodiments, the noncircular profile is rectangular, and square in the illustrated embodiment.

The described and illustrated masonry anchor 10 provides a connection system in which a series of mounting fasteners 20, which may be interchangeable, be used in connection with a masonry anchor. This simplifies manufacturing, distribution, and retailing. Although the masonry anchor 10 may be installed in an existing masonry material, it may also be cast in the material at predetermined locations, thereby providing a socket in which a number of different mounting fasteners can be fitted. In embodiments to be cast in place, the masonry anchor may be installed with a protective cap to prevent material entering the socket 14.

In one form, the system is configured to install a mounting fastener in a masonry panel and comprises a socket to be embedded in the panel which is accessible after installation. The socket is configured to releasably receive a mounting portion of a correspondingly shaped mounting fastener and the socket includes resiliently displaceable locking formations configured to be received against the mounting portion to secure the mounting fastener to the panel.

Those skilled in the art will appreciate that many differently configured mounting fasteners may be used with the masonry anchor 10, such as for example, a screw thread, a bar, a hook, a clip, a low profile mount, a structural mount, or an eyelet, some of which are illustrated in FIGS. 5 and 6.

It will be appreciated that other connection methods may be used for joining/coupling the masonry anchor and the mounting fastener. In another embodiment (not illustrated), the masonry anchor and the mounting fastener are secured with a push and twist action. In such embodiments, the action of pushing the fastener into the socket and twisting, in some embodiments over an angle of 90 degrees, may in one example cause a detent in the socket to engage a corresponding feature on the mounting fastener to cause a more permanent lock.

It will also be appreciated that a limiting factor in the strength of a masonry anchor is the cross-sectional width on the anchor and its resistance to shearing. In another embodiment (not illustrated), the end of the anchor member may be male, or in the form of a protrusion, with the mounting portion of the mounting fastening being female or a socket configured to be received over the male end of the anchor member.

The embodiments have been described by way of example only and modifications are possible within the scope of the present disclosure disclosed.

The invention claimed is:

1. A masonry anchor comprising: an anchor member having a socket formed in one end, the socket being configured to receive a mounting portion of a mounting fastener, the anchor member including (a) a locking element and (b) a resilient band that extends around the locking element and that is formed separately from the locking element, the locking element configured to be urged radially outwardly by the mounting fastener when the mounting fastener is in a partially installed position in the socket, and the locking element configured to move radially inwardly into a groove defined by the mounting portion when the mounting fastener is in a fully installed position in the socket.

2. The masonry anchor of claim 1, wherein the locking element is radially movable between a first position and a second position.

3. The masonry anchor of claim 2, wherein the locking element is at least partially located within a void defined by the anchor member when the locking element is in the first position.

4. The masonry anchor of claim 3, wherein the locking element is sized and shaped to be at least partially received in the groove defined by the mounting portion of the mounting fastener.

5. The masonry anchor of claim 4, wherein the locking element is biased to the first position by the resilient band.

6. The masonry anchor of claim 4, wherein a portion of the socket is shaped to receive a noncircular profile of the mounting portion of the mounting fastener to enable transmission of torque from the mounting fastener to the anchor member.

7. The masonry anchor of claim 6, wherein the locking element is positioned relative to the portion of the socket such that the locking element is at least partially received in the groove when the noncircular profile of the mounting portion of the mounting fastener is received in the portion of the socket.

8. The masonry anchor of claim 6, wherein the noncircular profile is rectangular.

9. The masonry anchor of claim 1, wherein the socket is configured to receive the mounting portion of the mounting fastener via axial and rotational movement of the mounting portion relative to the socket.

10. The masonry anchor of claim 1, wherein the resilient band includes a longitudinal split.

11. The masonry anchor of claim 1, wherein the resilient band is configured to cause the locking element to move radially inwardly when the mounting fastener is in a fully installed position in the socket.

12. A kit comprising:
a mounting fastener having a mounting portion; and
a masonry anchor comprising an anchor member having a socket formed in one end, the socket being configured to receive the mounting portion of the mounting fastener, the anchor member including (a) a locking element and (b) a resilient band that extends around the locking element and that is formed separately from the locking element, the locking element configured to be urged radially outwardly by the mounting fastener when the mounting fastener is in a partially installed position in the socket, and the locking element configured to move radially inwardly into a groove defined by the mounting portion when the mounting fastener is in a fully installed position in the socket.

13. The kit of claim 12, wherein the locking element is radially movable between a first position and a second position, the locking element sized and shaped to be at least partially received in the groove when in the first position to secure the mounting portion of the mounting fastener.

14. The kit of claim 12, wherein the mounting fastener is one selected from the group consisting of: a screw thread, a hook, a bar, a clip, a low profile mount, a structural mount, and an eyelet.

15. A masonry anchor comprising: an anchor member having a socket formed in one end, the socket being configured to receive a mounting portion of a mounting fastener, the anchor member including (a) a locking element and (b) a resilient band that extends around the locking element and that includes a longitudinal split, the locking element configured to be urged radially outwardly by the mounting fastener when the mounting fastener is in a partially installed position in the socket, and the locking element configured to move radially inwardly into a groove defined by the mounting portion when the mounting fastener is in a fully installed position in the socket.

16. A kit comprising:
a mounting fastener having a mounting portion; and
a masonry anchor comprising an anchor member having a socket formed in one end, the socket being configured to receive the mounting portion of the mounting fastener, the anchor member including (a) a locking element and (b) a resilient band that extends around the locking element and that includes a longitudinal split, the locking element configured to be urged radially outwardly by the mounting fastener when the mounting fastener is in a partially installed position in the socket, and the locking element configured to move radially inwardly into a groove defined by the mounting portion when the mounting fastener is in a fully installed position in the socket.

17. The kit of claim 16, wherein the mounting fastener is one selected from the group consisting of: a screw thread, a hook, a bar, a clip, a low profile mount, a structural mount, and an eyelet.

* * * * *